United States Patent [19]
Ikegame et al.

[11] Patent Number: 5,875,166
[45] Date of Patent: Feb. 23, 1999

[54] OPTICAL PICK-UP APPARATUS HAVING LOW COEFFICIENT OF FRICTION BETWEEN SLIDE BEARING AND GUIDING MEMBER

[75] Inventors: Tetsuo Ikegame, Hachioji; Hiroshi Ezawa, Sagamihara; Junichi Nakano, Hino, all of Japan

[73] Assignee: Olympus Optical Co., Ltd., Tokyo, Japan

[21] Appl. No.: 681,972

[22] Filed: Jul. 30, 1996

[30] Foreign Application Priority Data

Aug. 1, 1995 [JP] Japan .................................. 7-196450

[51] Int. Cl.$^6$ ........................................................ G11B 7/00
[52] U.S. Cl. .......................................... 369/112; 369/44.14
[58] Field of Search ................................... 369/112, 44.14, 369/44.15, 44.16, 44.21, 44.22; 359/813, 814, 823, 824

[56] References Cited

U.S. PATENT DOCUMENTS

| | | |
|---|---|---|
| 4,864,170 | 9/1989 | Eguchi . |
| 5,214,630 | 5/1993 | Goto et al. ............................ 369/112 X |
| 5,347,500 | 9/1994 | Eguchi ................................ 369/44.16 X |
| 5,532,989 | 7/1996 | Getrever et al. ....................... 369/44.15 |

FOREIGN PATENT DOCUMENTS

| | | |
|---|---|---|
| 63-224037 | 9/1988 | Japan . |
| 2223077 | 9/1990 | Japan . |
| 489668 | 3/1992 | Japan . |
| 492263 | 3/1992 | Japan . |
| 6195734 | 7/1994 | Japan . |
| 6325389 | 11/1994 | Japan . |

Primary Examiner—Paul W. Huber
Attorney, Agent, or Firm—Stevens, Davis, Miller & Mosher, L.L.P.

[57] ABSTRACT

An optical pick-up apparatus for writing and/or reading information on and/or from an optical record medium including a light source, an objective lens projecting a light beam emitted by the light source onto the optical record medium, a holding member holding the objective lens movably in a focusing direction to perform a focusing control, a carriage to which the holding member is secured, a supporting mechanism for supporting the carriage movably in a tracking direction to effect a tracking control as well as an access control, and a driving member moving a movable member including the objective lens, holding member and carriage in the tracking direction. The supporting mechanism includes guide rails extending in the tracking direction and slide bearings formed in the carriage and coupled with the slide bearings. A coefficient of static friction of the movable member is set to a value not larger than 0.25.

25 Claims, 11 Drawing Sheets

FIG_9

OPTICAL PICK-UP APPARATUS HAVING LOW COEFFICIENT OF FRICTION BETWEEN SLIDE BEARING AND GUIDING MEMBER

BACKGROUND OF THE INVENTION

1. Field of the Invention

The present invention relates to an optical pick-up apparatus comprising a light source emitting a light beam, an objective lens projecting the light beam onto an optical record medium as a fine spot, a movable member including a holding means for holding the objective lens movably in a focusing direction parallel to an optical axis of the object lens to perform a focusing control, a supporting means for supporting the movable member movably in a tracking direction perpendicular to said focusing direction as well as to a direction of an information track formed in the optical record medium, a driving means for driving the supporting means in the tracking direction to perform a tracking control as well as an access or seek control.

2. Related Art Statement

The optical pick-up apparatus of the kind mentioned in the preamble has been known and has been widely used in various optical information recording and/or reading apparatuses using optical record medium such as CD-ROM, magneto-optical disk and phase-change disk.

In the optical information recording and/or reproducing apparatus, there are provided three kinds of supporting mechanisms for moving a light spot with respect to an optical record medium, i.e., a mechanism for moving the light spot in the tracking direction across whole information tracks to perform an access, a mechanism for moving the light spot over a very small distance in the tracking direction to effect the tracking control, and a mechanism for moving the light spot in the focusing direction perpendicular to a plane of the optical record medium.

In order to reduce a size and a cost of the optical pick-up apparatus, there has be en proposed an optical pick-up apparatus in which the access control and tracking control are carried out by one and same supporting mechanism. For instance, Japanese Patent Laid-open Publication Kokai Sho 63-224037 teaches such an optical pick-up apparatus. FIGS. 11 and 12 are perspective view and side view, respectively showing the known optical pick-up apparatus disclosed in said Publication. An objective lens 50 is supported on a movable member 51, which is then supported by a pair of guide rods 52 slidably in a direction x which is perpendicular to directions y and z. It should be noted that the direction z is the focusing direction and the direction x is the access direction as well as the tracking direction. To this end, there are provided a coil 53 for performing the tracking control and access control and a magnetic circuit 54.

The objective lens 50 is held by a holder 59 and the holder is supported by a pair of leaf springs 56 movably in the focusing direction z, these leaf springs being secured to a fixing member 57 provided on a carriage 55. To the holder 59 is secured a focusing coil 58 which cooperates with the magnetic circuit 54.

In the above mentioned known optical pick-up apparatus in which both the tracking control and access control are carried out by the same driving means including the coil 53 and magnetic circuit 54, during the tracking control, the light spot has to be moved in the tracking direction x in a very precise manner in order that the light spot follows a very fine displacement of the information track. In the known apparatus shown in FIGS. 11 and 12, holes formed in the carriage 55 are constructed as slide bearings, and guide rails 52 are inserted in these slide bearings. Then, a coefficient of static friction $\mu$ between the slide bearings and the guide rails 52 has to be considered. When the coefficient of static friction $\mu$ is large, it is impossible to perform a precise and fine tracking control and the light spot could not follow an information track precisely and information could not be read and/or read accurately. In the known optical pick-up apparatuses, a value of the static friction between the slide bearings and the guide rails has not been mentioned at all. That is to say, there has not been proposed any indication in designing the slidable coupling between the slide bearings and the guide rails.

There has been proposed another type of optical pick-up apparatus in which an objective lens holder is supported movably in the tracking direction with respect to a movable member and the movable member is arranged movably in the tracking direction over a relatively large distance to perform the track access control. Such an optical pick-up apparatus may be called a dual-stage servo apparatus. In such a dual-stage servo optical pick-up apparatus, the above mentioned problem of the static friction does not occur. Therefore, a person skilled in the art could not derive any suggestion in designing the slidable coupling between the slide bearings and the guide rails from the dual-stage servo optical pick-up apparatus.

SUMMARY OF THE INVENTION

The present invention has for its object to provide a novel and useful optical pick-up apparatus, in which a static friction between the slidable bearings and the guide rails can be set to a value at which the tracking control can be performed precisely.

According to the invention, an optical pick-up apparatus comprises:

a light source emitting a light beam;

an objective lens projecting the light beam emitted by said light source onto an optical record medium as a fine spot;

a movable member including a holding means for holding the objective lens movably in a focusing direction parallel to an optical axis of the object lens to perform a focusing control and a carriage on which the holding means is provided;

a supporting means for supporting the movable member movably in a tracking direction perpendicular to the focusing direction as well as to a direction of an information track formed in the optical record medium; and a driving means for driving the supporting means in the tracking direction to perform a tracking control as well as an access control; wherein the supporting means includes guide members extending in the tracking direction and slide bearings provided in the movable member and coupled with the guide members, and a coefficient of static friction between the slide bearings and the guide members is set to be not larger than 0.25.

According to another aspect of the invention, an optical pick-up apparatus comprises:

a light source emitting a light beam;

an objective lens projecting the light beam emitted by the light source onto an optical record medium as a fine spot;

a movable member including a holding means for holding the objective lens movably in a focusing direction parallel to an optical axis of the object lens to perform a focusing control and a carriage on which the holding means is provided;

a supporting means for supporting the movable member movably in a tracking direction perpendicular to the focusing direction as well as to a direction of an information track formed in the optical record medium; and a driving means for driving the supporting means in the tracking direction to perform a tracking control as well as an access control; wherein the supporting means includes guide members extending in the tracking direction and slide bearings provided in the movable member and coupled with the guide members, and the slide bearings and guide members are constructed to satisfy the following condition:

$$\mu s < \alpha D \cdot (\Delta x / \Delta e) \cdot M / (Mg+F)$$

wherein $\mu s$ is a coefficient of static friction between the slide bearings and the guide members, $\Delta D$ an acceleration of an external disturbance in the tracking direction, $\Delta x$ a residual error introduced by the static friction, $\Delta e$ a desired residual error, M a mass of the movable member including the slide bearings, g is the acceleration of gravity, and F is a preliminary pressure value including zero.

DESCRIPTION OF THE PREFERRED EMBODIMENTS

Figure 1:
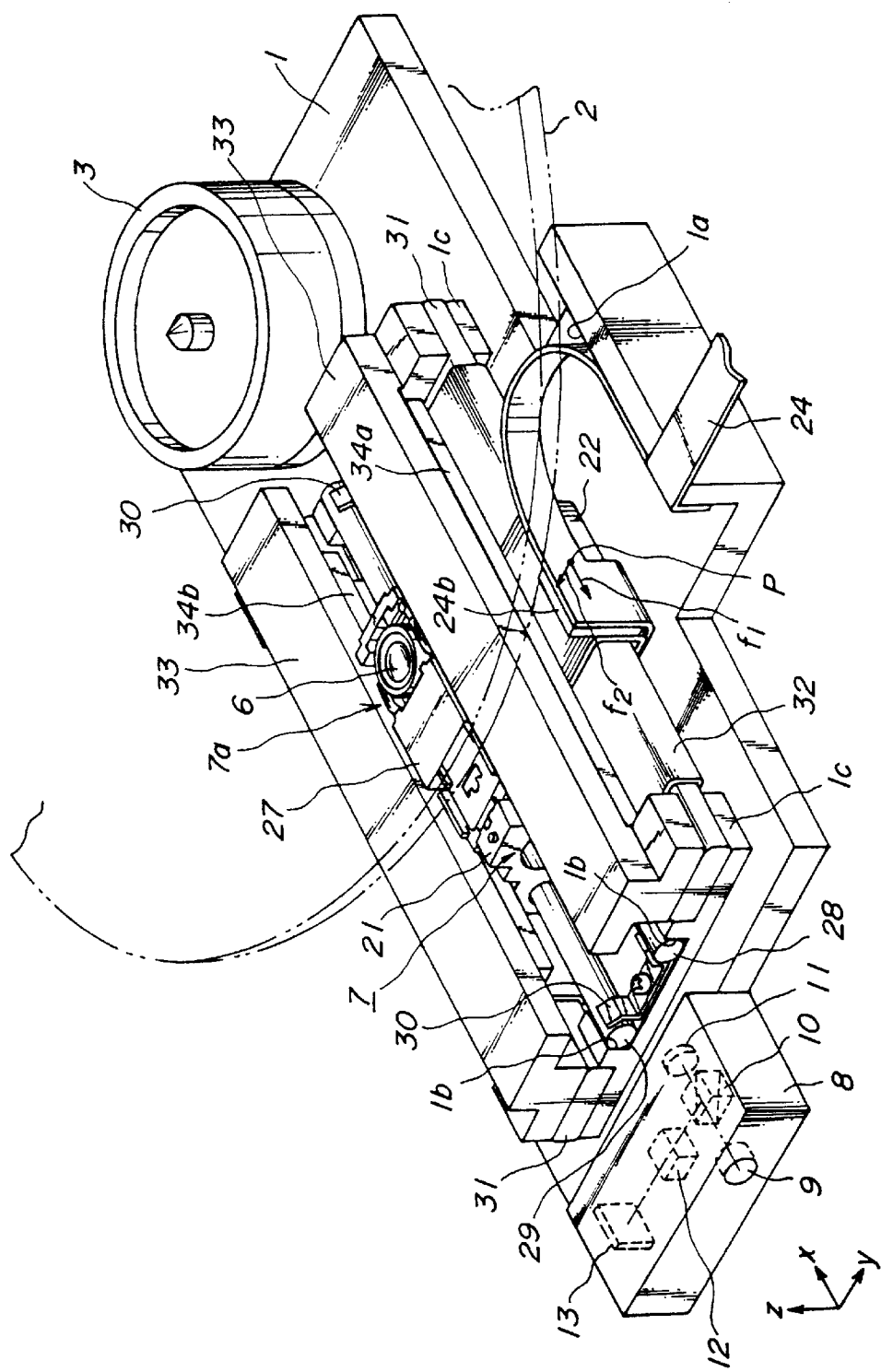
FIG. 1 is a perspective view showing an embodiment of the optical pick-up apparatus according to the invention.
Figure 2:
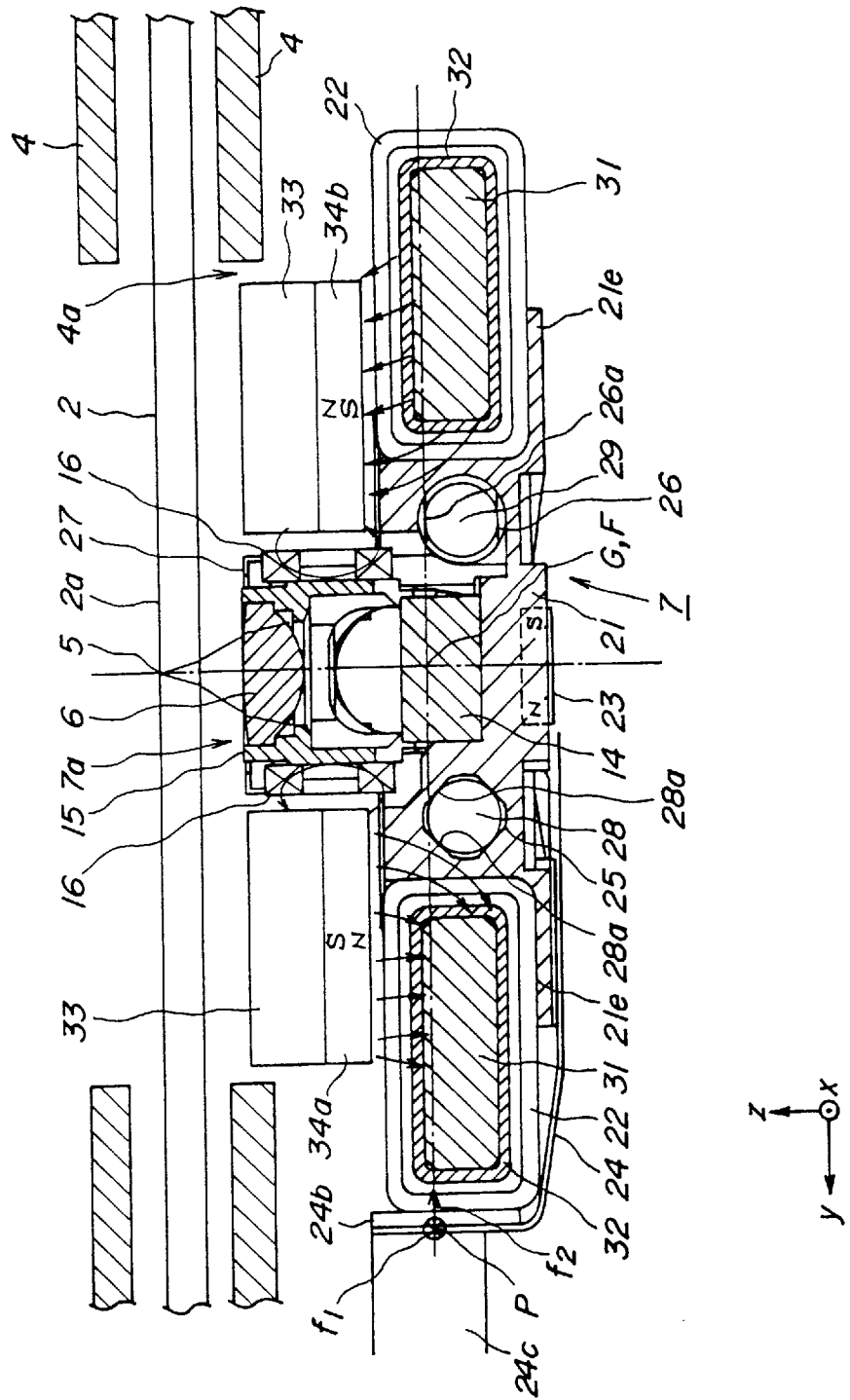
FIG. 2 is a vertical cross sectional view of a movable member.

FIGS. 1–6 show an embodiment of the optical pick-up apparatus according to the invention. As shown in FIG. 1, the apparatus comprises a base member 1 and a spindle motor 3 arranged on the base member for rotating an optical record disk 2. As illustrated in FIG. 2, the optical record disk 2 is installed in a cartridge 4. An objective lens 6 for projecting a light spot 5 onto an information record plane 2a of the optical record disk 2 is supported in a movable member 7 which is arranged movably in a direction x, i.e. tracking direction.

As shown in FIG. 1, on one side of the base member 1 (−x side), there is arranged a stationary optical system 8 including laser light source 9, beam splitter 10, collimator lens 11, error detecting hologram 12, photodetector 13 and so on. A laser light beam emitted by the laser light source 9 is transmitted through the beam splitter 10 and is converted by the collimator lens 11 into a parallel laser light beam. Then the parallel laser beam is transmitted through a hole formed in the movable member 7, reflected by a mirror 14 toward the objective lens 6. Then, the laser beam is made incident upon the information record plane 2a of the optical record disk 2 as a very fine light spot (see FIG. 2).

Return laser light reflected by the optical record disk 2 is made incident upon the beam splitter 10 along the same optical path along which the laser beam is made incident upon the optical record disk 2. Then the return laser light is reflected by the beam splitter 10 and is made incident upon the photodetector 13 via the error detecting hologram 12 by means of which the return laser light is subjected to a diffraction. By processing an output signal from the photodetector 13, reproduced information signal, tracking error signal and focusing error signal can be derived.

In the movable member 7, the objective lens 6 is secured to a center of a holder 15 formed by a molding of plastics such as liquid crystal polymer. To opposite side surfaces of the holder 15 are secured focusing coils 16. Each of the focusing coils 16 is formed by winding an aluminum wire with or without a copper cladding in a rectangular shape.

Figure 3:
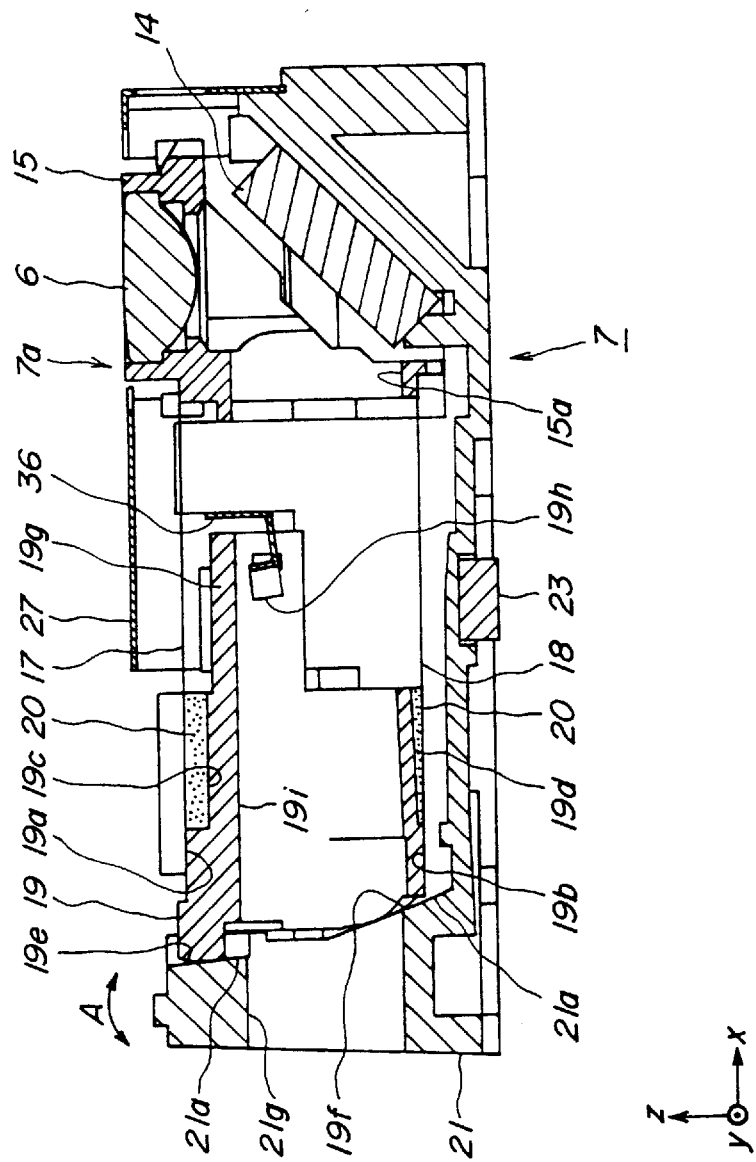
FIG. 3 is a vertical cross sectional view illustrating the movable member viewed from a different direction.

As best shown in FIG. 3, one ends of a pair of focus springs 17 and 18 are secured to the holder 15 at upper and lower surfaces of a projection 15a of the holder. The other ends of the focus springs 17 and 18 are secured to upper and lower surfaces 19a and 19b of a holding member 19.

Figure 4:
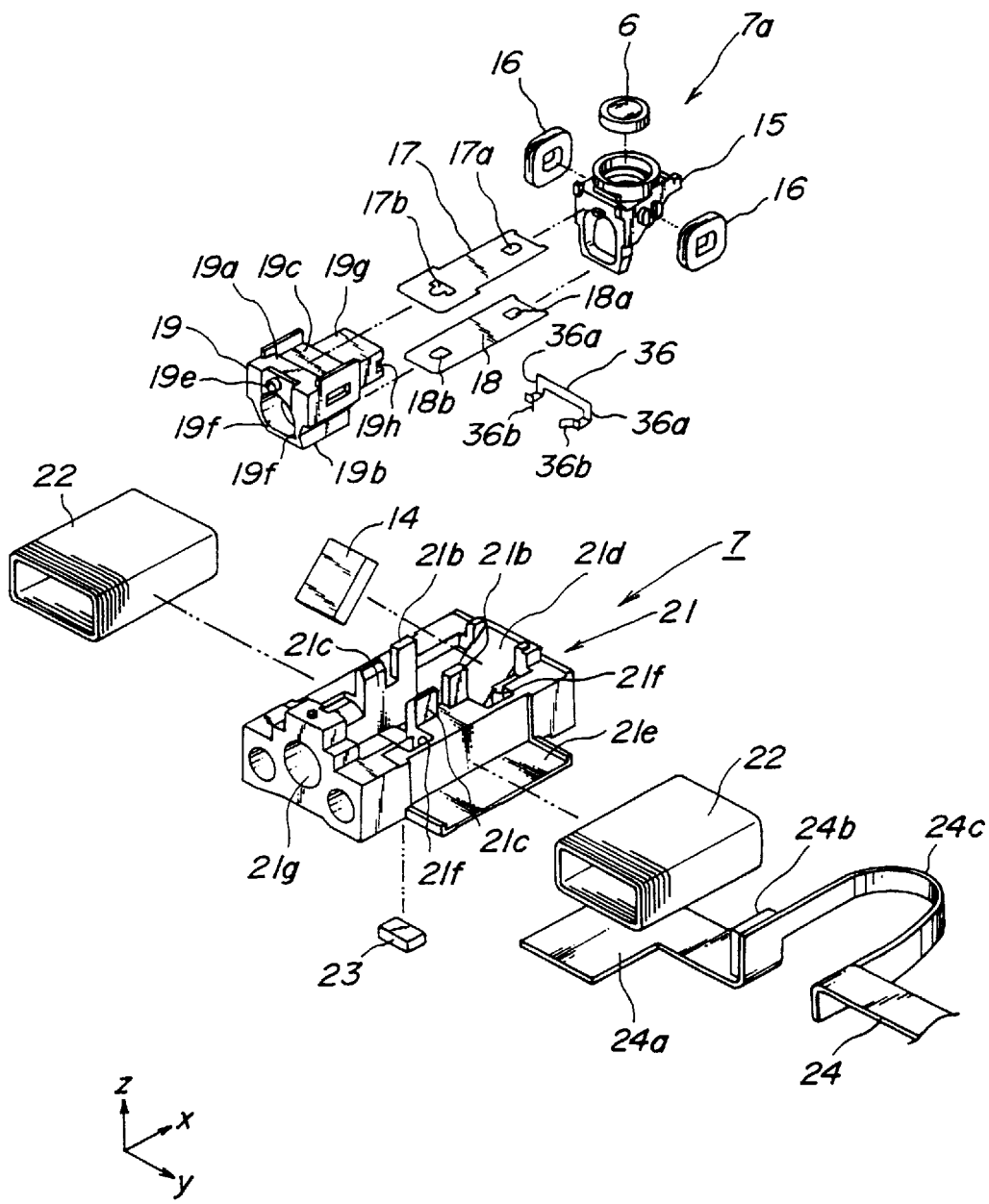
FIG. 4 is an exploded view depicting the movable member.

As illustrated in FIG. 4, each of the focus springs 17 and 18 is formed by a substantially rectangular leaf spring and holes 17a, 17b and 18a, 18b are formed at both end portions, said holes serving to adjust a spring constant as well as to position the spring with respect to a jig for assembling the optical pick-up unit. The focus springs 17 and 18 extend in the direction x in parallel with each other. The focus springs 17 and 18 may be manufactured by etching a thin non-magnetic material sheet such as a stainless steel sheet having a thickness of about 20 $\mu$m.

In this manner, a focus driving unit 7a including the holder 15, focusing coils 16 and focus springs 17 and 18 drives the objective lens 6 in the focusing direction z in accordance with the focusing error signal.

As shown in FIG. 3, in the fixing surfaces 19a and 19b of the holding member 19 there are formed recesses 19c and 19d, respectively having a depth of about 0.2–1 mm, and damping members 20 are provided in these recesses. In order to form the damping members 20, thermoplastic silicone gel may be applied into said recesses 19c and 19d and is retained therein by a surface expansion, and then an assembly may be heated to harden the silicone gel.

In a side wall of the holding member 19, there are formed contact portions 19e and 19f (two portions 19f), said contact portions situate on a spherical surface having a center at a nodal point of the objective lens 6. The contact portions 19e and 19f are brought into contact with fitting surface 21a of a carriage 21, said fitting surface constitutes a spherical surface having a center at the nodal point of the objective lens 6.

Between the holding member 15 and the carriage 21, there is arranged a spring 36 having a stem portion and arm portions. The stem portion is engaged with projections 21b provided substantially at a center of the carriage, and projections 36b of the arm portions are engaged with recesses 19h formed in side walls of a projection 19g of the holding member 19 opposing in the direction y (see FIGS. 3 and 4). Therefore, the contact portions 19e and 19f of the holding member 19 are urged against the fitting surface 21a of the carriage 21 by means of the spring 36. Then, the holding member 19 may be rotated with respect to the carriage 21 about the x axis as well as the y axis. In this manner, the holding member 19 can be adjusted with respect to the carriage 21 in an easy and precise manner. After adjustment, an adhesive agent is supplied into spaces between the holding member 19 and the fitting surface 21a of the carriage 21. Furthermore, the adhesive agent is supplied into spaces having a depth of about 0.2 mm formed between projections 21c of the carriage 21 and the side walls of the projection 19g of the holding member 19 opposing in the direction y. Then, the adhesive agent is hardened. In this manner, the holding member 19 is secured to the carriage 21 at three points which situate at upper and lower positions viewed in the direction x. It should be noted that the carriage 21 is formed by a single mold body of plastics. For instance, the carriage 21 may be made of epoxy resin containing silica balls or a thermoplastic polyimide resin containing carbon fibers by 30%.

The carriage 21 further has an inclined surface 21d substantially at a center thereof. This surface 21d is inclined by 45 degrees with respect to the direction x and is positioned below the objective lens 6. A mirror 14 is secured to the inclined surface 21d. In side walls of the carriage 21 mutually opposing in the direction y, there are formed coil fitting portions 21e and tracking coils 22 are secured to these fitting portions 21e. Each of the tracking coils 22 is formed in a rectangular post.

To a rear surface of the carriage 21 is secured one end 24a of a flexible print circuit (FPC) board 24 for supplying focusing signal and tracking signal to the focus coils 16 and tracking coils 22, respectively. A reinforcing plate 24b of the FPC board 24 is secured to a side wall of the tracking coil 22. A flexible portion 24c of the FPC board 24 is extended from the reinforcing plate 24b in the direction x in a U-shape manner and the other end of the flexible portion 24c is secured to an upright wall 1a of the base member 1 as illustrated in FIG. 1.

As shown in FIG. 2, a center point P of the reinforcing plate 24b is set to be identical with a center of gravity G of the movable member 7 as well as centers of slide bearings 25, 26 to be explained later. Therefore, the movable member 7 can be effectively prevented from being tilted due to a repelling force and an inertial force of the bending portion 24c of the FPC board 24 upon a movement of the movable member in the direction x.

Figure 5:
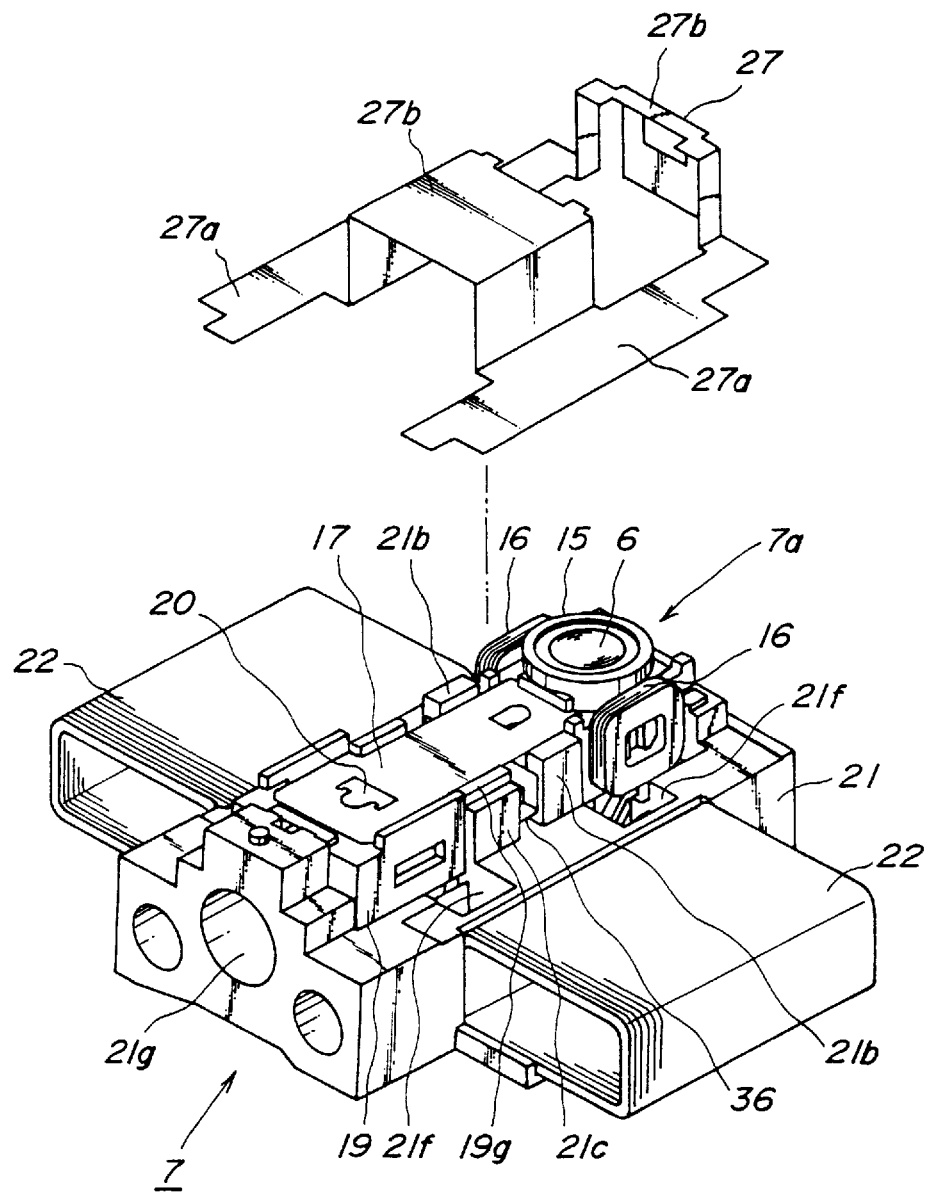
FIG. 5 is a perspective view of the movable member from which a cover is removed.

As depicted in FIG. 5, on the upper surfaces of the carriage 21 and tracking coils 22 there is secured by an adhesive agent a cover 27 made of non-magnetic material having a low magnetic permeability not higher than 1.1 such as SUS316 and SUS310. The cover 27 may be simply formed by pressing a stainless steel plate. Portions 27a of the cover 27 are secured to the carriage 21 such that openings 21f of the carriage are covered with said portions 27a. Further, said portions 27a of the cover 27 serve to couple the upper surfaces of the tracking coils 22 to the carriage 21, and thus a mechanical strength of the tracking coils 22 is increased. Moreover, the cover 27 includes a portion 27b which connects the portions 27a. Therefore, a mechanical strength of the carriage 21 against a twisting movement about the y axis can be increased.

As illustrated in FIG. 2, in the carriage 21 there is formed a through hole extending in the direction x and a pair of slide bearings 25 are formed in the through hole at positions which are separated from each other in the direction x. Each of the slide bearings 25 is formed by cutting a cylindrical body having a diameter which is larger than a diameter of a guide rail 28 inserted into the through hole by about 0.1–0.4 mm, along four flat surfaces which are inclined by ±45 degrees with respect to an x-y plane. There is a play of about 5–30 $\mu$m between each of said inclined planes and the guide rail.

In the carriage 21 there is further formed a through hole extending in the direction x and a slide bearing 26 is formed at a middle thereof. The slide bearing 26 is formed by cutting a cylindrical body having a diameter larger than a diameter of a guide rail 29 by about 0.1–0.4 mm, along upper and lower flat surfaces extending in parallel with the x-y plane. There is a play of about 5–30 $\mu$m between each of these flat surfaces and the guide rail 29.

The slide bearings 25 and 26 are formed such that said flat surfaces being brought into contact with the guide rails 28 and 29 have a surface roughness not larger than 6.3S, particularly between 0.3S and 3S. Each of the guide rails 28 and 29 is formed by a non-magnetic stainless steel rod which is made of SUS304 and has a fluorine-contained resin coating applied thereon. The coating is polished to have a surface roughness of about 0.4S and a thickness of 5–20 $\mu$m. Both ends of the guide rails 28 and 29 are secured to fitting corners of the base member 1 by means of springs 30.

In this manner, the guide rail 28 is slidably supported by the slide bearings 25 and the guide rail 29 is slidably supported by the slide bearing 26. Then, the movable member 7 can be moved in the direction x.

Figure 6:
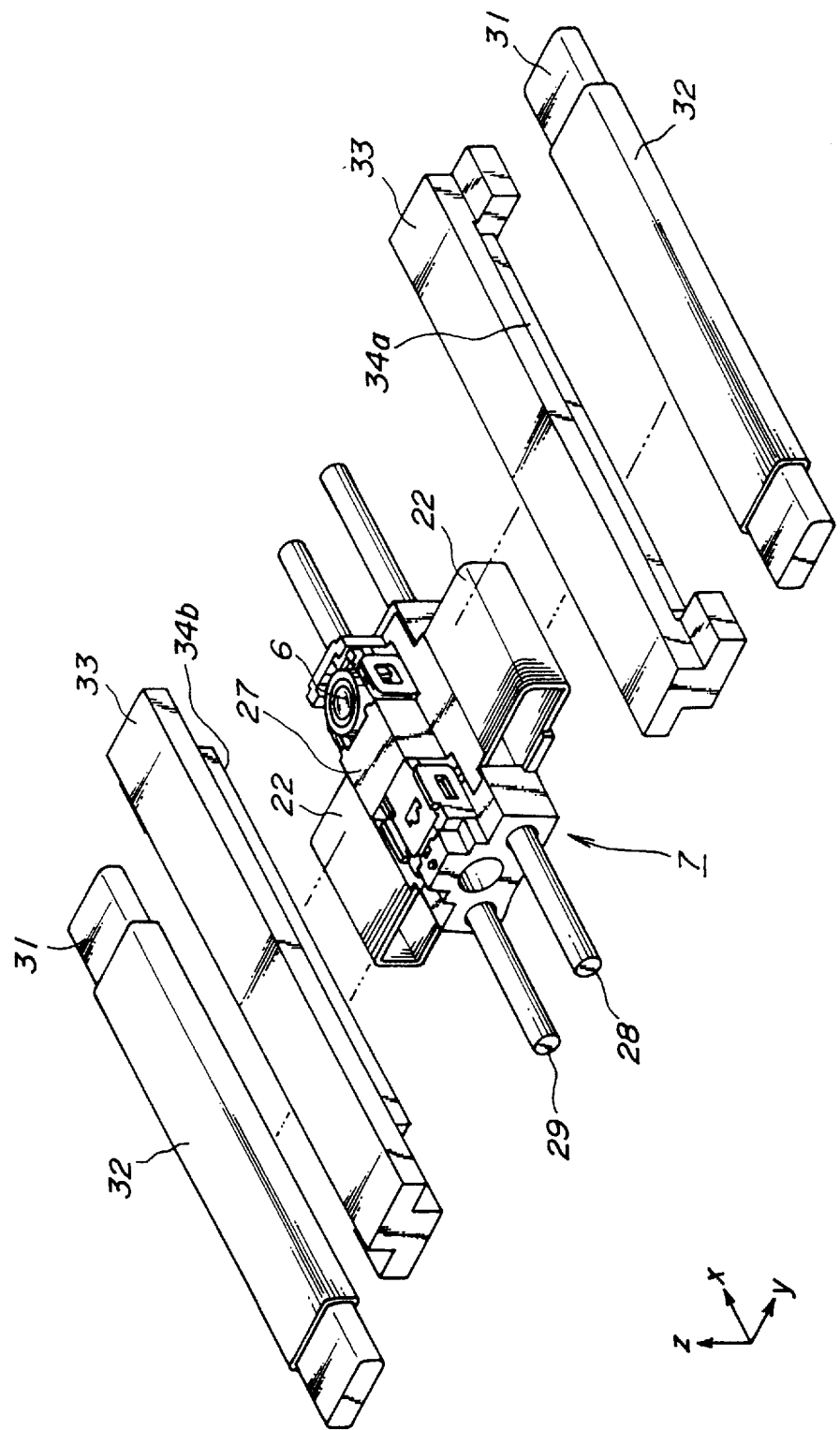
FIG. 6 is an exploded view representing a relationship between the movable member and a magnetic yoke.

As shown in FIGS. 1, 2 and 6, beside the guide rails 28 and 29 there are arranged center yokes 31 such that the yokes pass through the tracking coils 22. On these center yokes 31, short rings 32 made of non-magnetic material are provided. Both ends of the center yokes 31 are secured to fitting portions 1c of the base member 1 by means of screws. Above the center yokes 31 there are arranged side yokes 33 and permanent magnets 34a, 34b are secured to the side yokes 33. The side yokes 33 are positioned such that when the disk cartridge 4 is installed, the side yokes extend into opening 4a of the cartridge as shown in FIG. 2. The permanent magnets 34a and 34b are magnetized in the direction z. At both ends of the side yokes 33 there are provided arms which are brought into contact with the center yokes 31.

Between the center yokes 31 and the side yokes 33 there are produced effective magnetic fluxes via the upper and side surfaces of the tracking coils 22. Then, there are produced forces in the tracking direction x at these surfaces of the tracking coils 22. A point F at which a combined force in the tracking direction is produced situates slightly lower than the upper surfaces of the tracking coils 22. As shown in FIG. 2, said point F is identical with the center of gravity G of the movable member 7. These points F and G situate substantially on the upper surfaces of the guide rails 28 and 29, i.e. contact points of the slide bearings 25 and 26 with the guide rails 28 and 29. In this manner, the center point F of the tracking force, the center of gravity G and a center point of a frictional force produced between the slide bearings and the guide rails are substantially identical with each other, and thus an undesired rotation of the movable member 7 about the y axis can be effectively suppressed when the movable member is driven in the direction x.

The focusing coils 16 are arranged such that their upper surfaces situate substantially at a level of the side yokes 33 and their lower surfaces situate substantially at a level of the lower surface of the magnets 34a and 34b. Therefore, the magnetic flux passes through the upper and lower portions of the focusing coil 16 in opposite directions viewed in the direction y, and thus forces generated at these portions have the same direction z.

When an electric current corresponding to the focusing error is supplied to the two focusing coils 16, the objective lens 6 is moved in the focusing direction z, while the focus springs 17 and 18 are bent in the direction z. During this movement, the focus springs 17 and 18 are subjected to a damping force by the damper 20. The damper 20 is formed by supplying a damping material into the damper forming portions 19c formed between the focus springs 17, 18 and the holding member 19. Therefore, it is no more necessary to provide damping forming portions surrounding the whole focus springs 17, 18, and thus the holding member 19 can be small in size, and the focus springs can be easily secured to the holding member 19. In the present embodiment, the damping material can be easily poured through the openings 17a, 17b, 18a and 18b formed in the springs (see FIG. 4).

A laser light beam emitted from the stationary optical system 8 passes through a hole 21g formed in the carriage 21, a hole 19i formed in the holding member 19, a space between the focus springs 18 and 19 and a hole 9a formed in the holder 15, and is made incident upon the mirror 14. In order to pass the light beam through the space between the focus springs 18 and 19, these springs are arranged to be separated from each other by a relatively large distance. Therefore, resonance frequencies of the pitching movement of the movable member unit 7a about the axis y and the rolling movement of the movable member unit 7a about the axis x can be increased. As explained above, the supporting member 19 is cemented to the spherical surface 21a of the carriage 21 by the adhesive agent at the contact portions 19e and 19f which situate near the focus spring securing surfaces 19a and 19b. Furthermore, the side walls of the projection 19g of the supporting member 19 are cemented to the projections 21c of the carriage 21.

When the movable member 7 is moved in the tracking direction x by means of the tracking coils 22, the movable member unit 7a serves as an additional weight for the connecting points between the supporting member 19 and the carriage 21. Therefore, the securing surface 21a and portions 19a, 19b of the supporting member 19 are liable to be deformed or bent as shown by an arrow A in FIG. 3. However, according to the present embodiment, the projection 19g of the supporting member 19 is coupled with the carriage 21, and thus the above mentioned deformation can be minimized. In this manner, the mechanical strength of the coupling between the supporting member 19 and carriage 21 can be increased and a resonance frequency can be increased (see FIG. 3).

As stated above, the projection 19g of the supporting member 19 is secured to the projections 21c of the carriage 21 by the adhesive agent. These projections 21c situate substantially at a middle of the carriage 21 viewed in the direction x. Therefore, the carriage 21 is reinforced strongly and a resonance frequency of the carriage can be increased, although the carriage has formed a relatively large space at a middle thereof. It should be noted that the middle portion of the carriage 21 is further reinforced by the cover 27, and thus a mechanical strength can be further increased.

When a current corresponding to the tracking error is supplied to the tracking coils 22, an electro-magnetic force is produced due to cooperation of the coils and the magnetic fluxes generated by the magnets 34a and 34b, and the movable member 7 is driven in the tracking direction x. In the optical pick-up apparatus according to the invention, the tracking control and access control are performed by one and the same driving mechanism including the tracking coils 22, magnets 34a, 34b and yokes 31, 33. Therefore, during the access control mode, in addition to the tracking control signal, an access control signal is supplied to the tracking coils 22 such that the laser light spot can be moved across a whole information track area of the optical disk. Then, the light spot can be made incident upon a desired information track of the optical disk. In this manner, tracking mechanism can be made simple and small.

In order to perform the tracking control and access control by means of the single driving mechanism, a sensitivity of the tracking mechanism has to be increased and a resonance frequency of the movement of the movable member in the tracking direction x has to be made high. In order to increase a sensitivity of the movement, the magnetic circuit having a large weight is arranged not on the movable member 7, but on the base member 1. Furthermore, the carriage 21, supporting member 19 and holder 15 are formed by the molds of plastics in order to reduce a weight of the movable member 7. Moreover, a weight of the focusing coils 16 and tracking coils 22 is decreased by forming these coils with an aluminum wire with or without a copper cladding. These wires are lighter than a usual copper wire. In this manner, a total weight of the movable member 7 in the present embodiment can be about 1.8 grams.

In order to increase a sensitivity of the tracking movement, the magnets 34a and 34b are made of Nd-Fe-B having [BH]max=33–45MGOe. Further, a magnetic gap is directly formed by the magnets 34a, 34b and center yokes 31, and thus a magnetic flux density applied to the tracking coils 22 can be increased. In this manner, a sensitivity of the movement of the movable member 7 in the tracking direction x can be increased to 180m/$S^2$/A, which is comparable to that of the ordinary tracking actuators.

As explained above, in the present embodiment, a mechanical strength of the focus springs 17 and 18 is increased at portions near the fitting portions. The carriage 21 is reinforced by the cover 27 and supporting member 19, a distance between the focus springs 17 and 18 is widened such that the light beam can pass therethrough, and the focusing coil 16 and tracking coils 22 are formed by a light weight aluminum wire with or without a copper cladding. Then, a resonance frequency due to a deformation of the carriage 21 when the movable member 7 is moved in the tracking direction x and a resonance frequency due to a deformation of the focus springs 17, 18 can be increased and a servo characteristic can be improved.

The inventors have found experimentally that the resonance frequency in the tracking direction x can be increased higher than 10 kHz, particularly to 12 kHz, which is a typical value of ordinary tracking actuators. In order to further decrease an influence of the resonance, it is possible to set a cut-off frequency to 1–4 kHz by decreasing a gain at a resonance peak by inserting a notch filter in a servo circuit, said notch filter having a dip at the resonance frequency. In this manner, it is possible to further improve the servo characteristic.

In order to move the movable member 7 in a smooth manner, each of the slide bearings 25 is constructed by the four flat surfaces and the guide rail 28 is formed by a rod having a circular cross section, and thus the guide rail is brought into contact with the slide bearing along four lines extending in the tracking direction x. In this manner, a contact surface area of the guide rail 28 with the slide bearing 25 can be minimized and a frictional force produced by the guide rail 28 and slide bearing 25 can be decreased. Further, if dusts are adhered to the guide rail and slide bearings, the dust can escape into spaces formed between the guide rail and the through hole formed in the carriage 21. This is also applied to the slide bearing 26 and guide rail 29.

The carriage 21 is made of an epoxy resin containing silica balls or a thermoplastic polyimide resin containing carbon fibers by 30%. Therefore, the carriage 21 has a high stiffness against bending and further has an excellent sliding property. Further, the carriage 21 is formed by a molding such that the slide bearings formed integrally with the carriage have a surface roughness smaller than 6.3S, particularly from 0.3 to 3S.

Each of the guide rails 28 and 29 is formed by a stainless steel rod having a coating made of a fluorine-contained resin, a surface of said coating being polished such that the coating has a thickness of 5–20 $\mu$m and a surface roughness smaller than 3.2S, particularly of about 0.4S.

By constructing the slide bearings 25, 26 and guide rails 28, 29 in the manner stated above, a coefficient of static friction of the movable member 7 can be set to a value of about 0.2 which is smaller than 0.25. A coefficient of dynamic friction may be set to a value of about 0.09. Therefore, the movable member 7 can be moved in the tracking direction x in a very smooth manner, and the tracking control can be performed precisely with very small residual errors.

Moreover, the short yoke 32 is provided on the center yoke 31, and thus an inductance of the tracking coil 22 can be reduced below 100 $\mu$H, preferably 50 $\mu$H at a frequency of 1 kHz. Therefore, a quick response of the current supplied to the tracking coil can be attained.

In a modified embodiment of the optical pick-up apparatus according to the invention, as illustrated by chain a chain line in FIGS. 2 and 3, a permanent magnet 23 is secured to a rear surface of the carriage 21. This magnet 23 is magnetized in such a manner that its N-pole faces with the N-pole of the magnet 34a and its S-pole faces with the S-pole of the magnet 34b. Therefore, a repelling force is applied to the magnet 23 and the carriage 21 is pushed downward in the direction z. In this manner, the upper two surfaces of each of the slide bearings 25 are urged against surfaces 28a of the guide rail 28 and the upper surface 26a of the slide bearing 26 is urged against the upper surface of the guide rail 28, and thus the carriage 21 is urged against the guide rails 28 and 29 at a certain pressure without a play. In this manner, a preliminary pressure may be applied to the movable member.

In the above embodiment, there are provided two tracking coils for moving the movable member in the tracking direction x on respective sides of the carriage. However, according to the invention, only a single tracking coil may be arranged.

Figure 7:
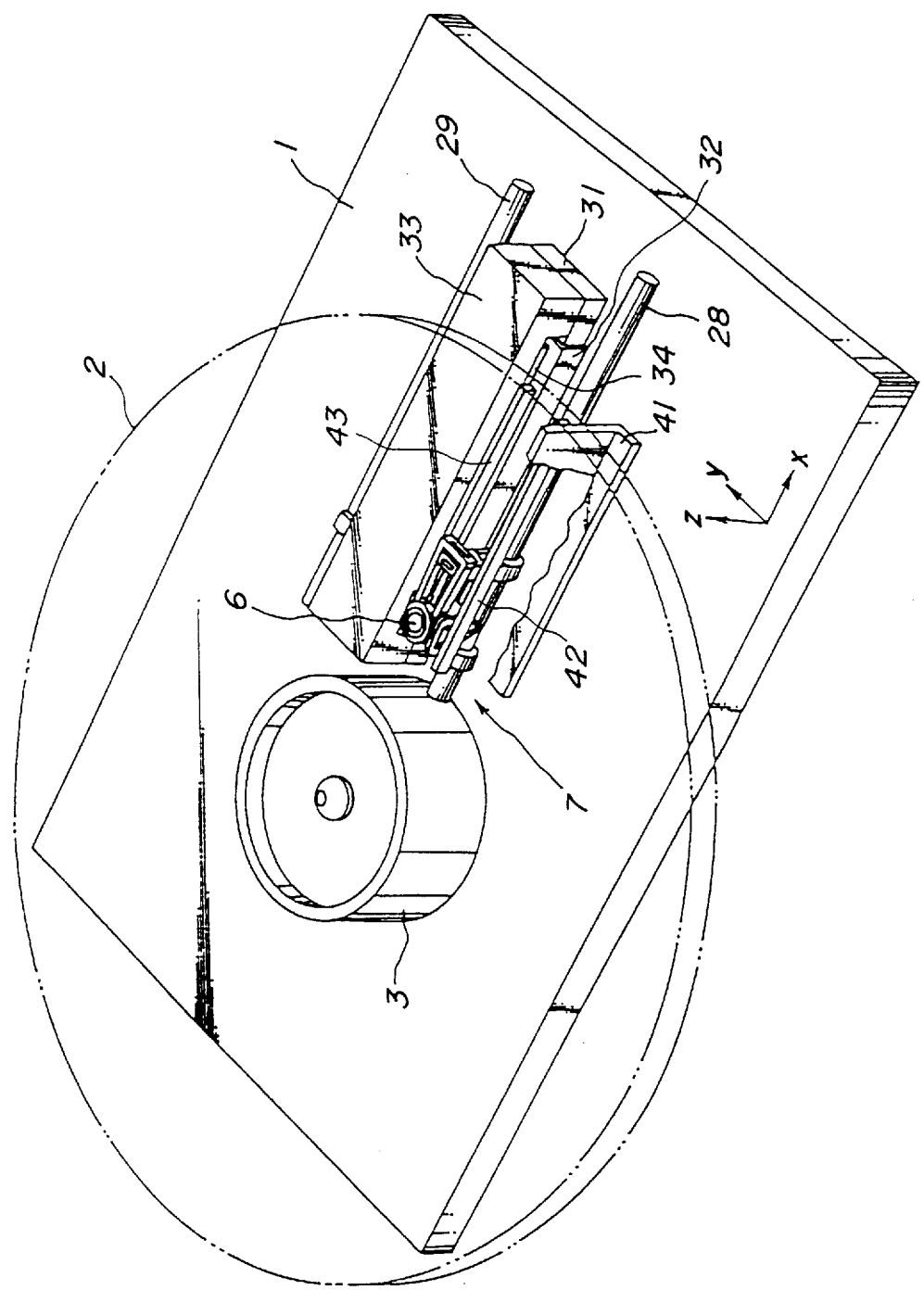
FIG. 7 is a perspective view depicting another embodiment of the optical pick-up apparatus according to the invention.
Figure 8:
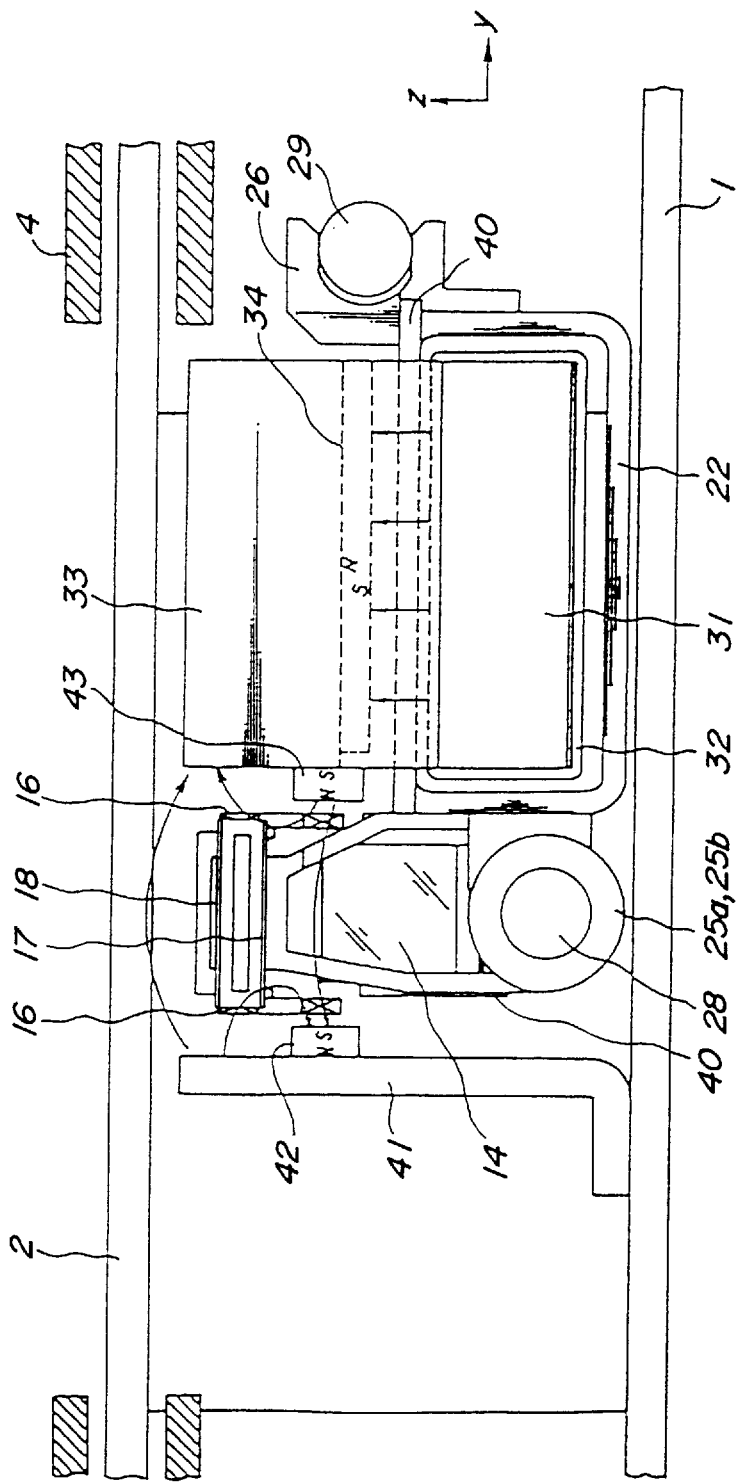
FIG. 8 is a front view of the optical pick-up apparatus shown in FIG. 7.
Figure 9:
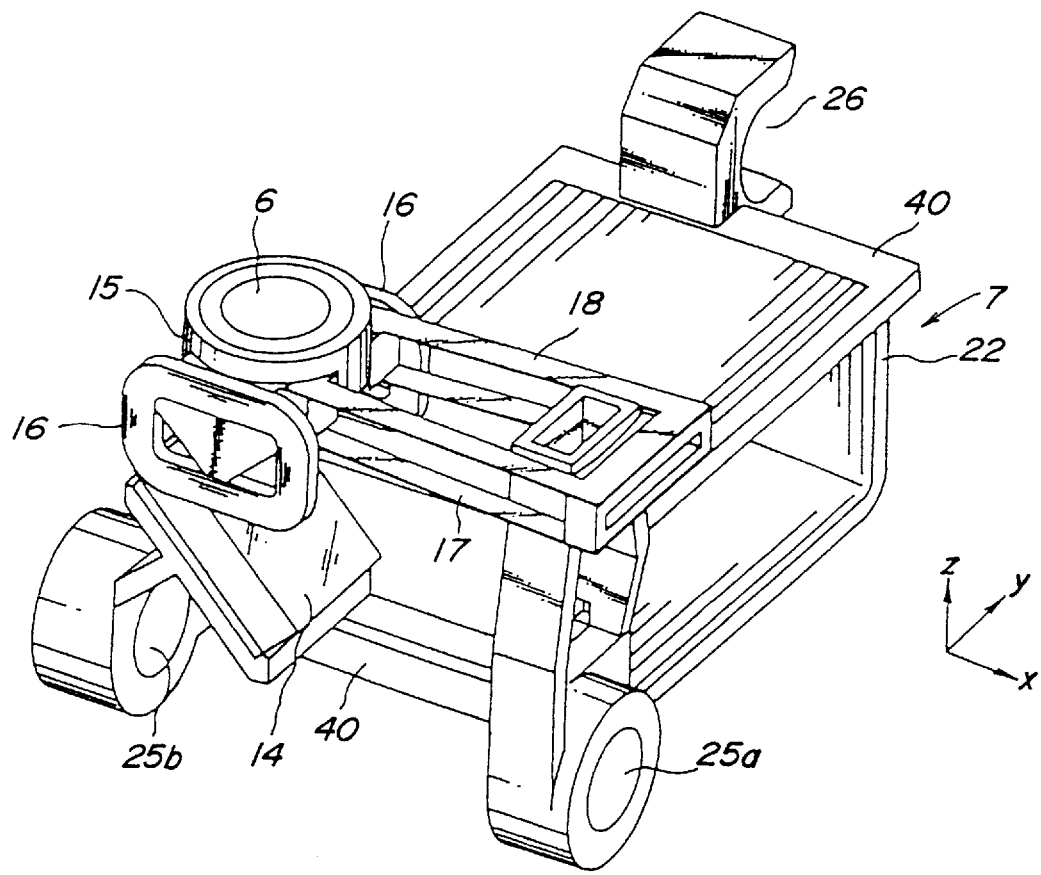
FIG. 9 is a perspective view of a movable member shown in FIG. 7.
Figure 10:
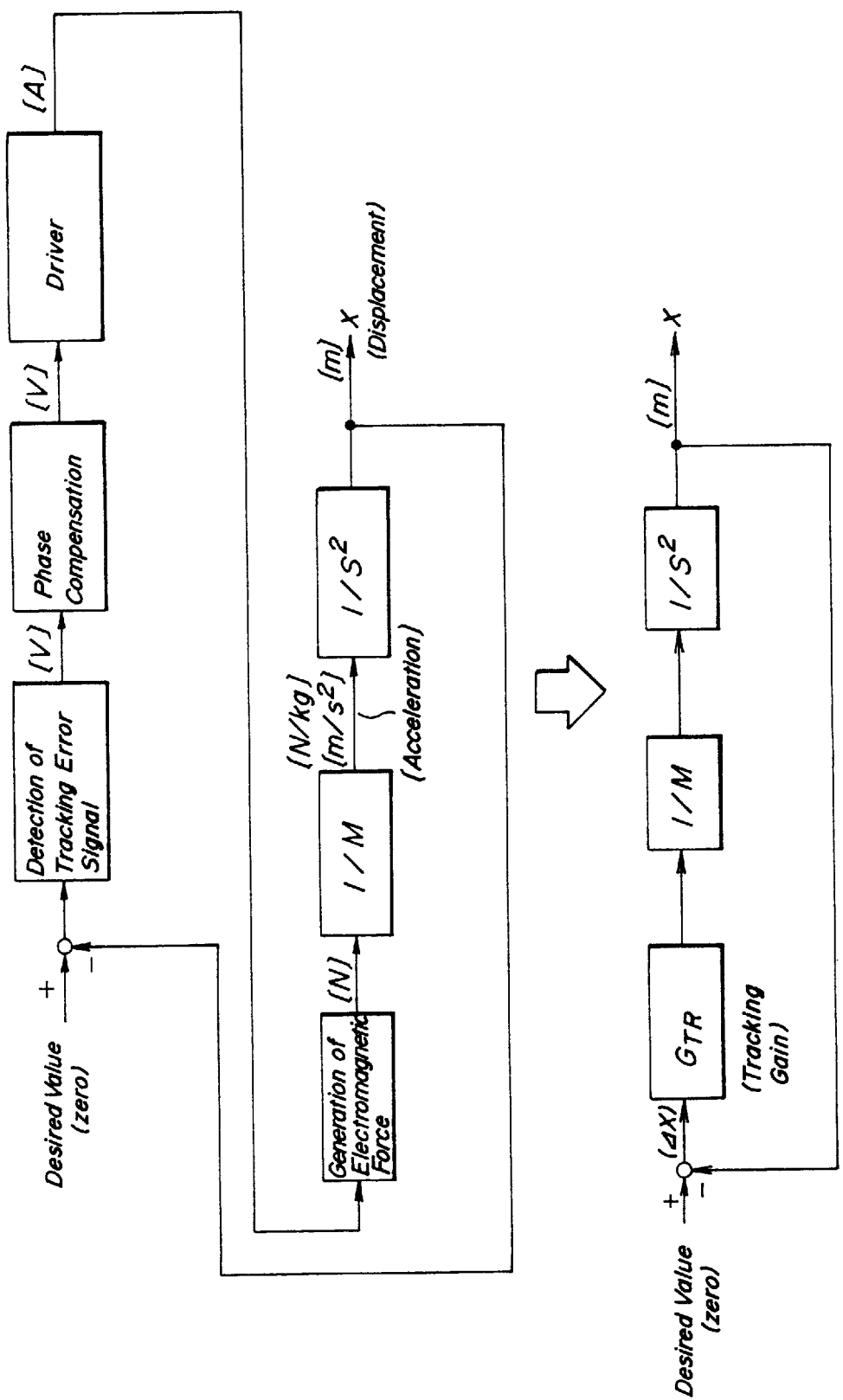
FIG. 10 is a block diagram illustrating a tracking control servo loop.
Figure 11:
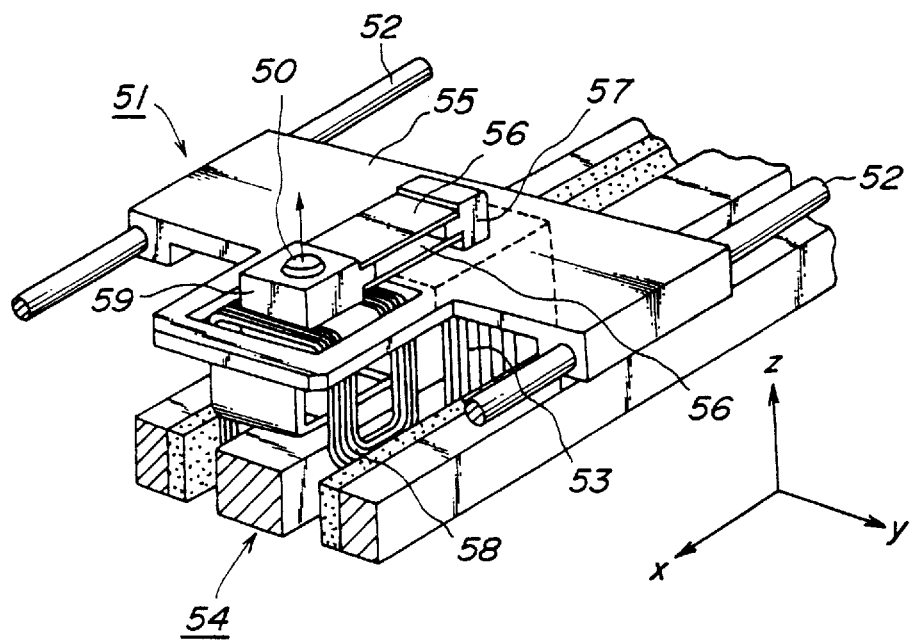
FIG. 11 is a perspective view depicting a known optical pick-up apparatus of single-stage servo type.
Figure 12:
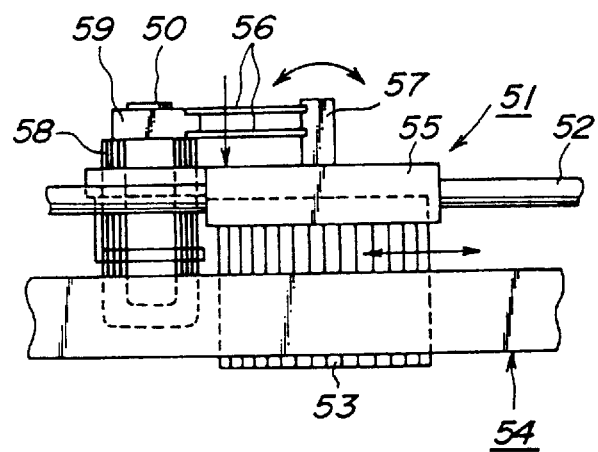
FIG. 12 is a side view of the known optical pick-up apparatus.

FIGS. 7, 8 and 9 illustrate another embodiment of the optical pick-up apparatus according to the invention, in which a single tracking coil is provided. In the present embodiment, portions similar to those of the previous embodiment are denoted by the same reference numerals and detailed explanation thereof is dispensed with. An objective lens 6 is provided in a holder 15 and the holder is supported by springs 17 and 18 movably in the focusing direction z, each of said springs having a pair of arm portions. First and second focusing coils 16a and 16b are secured to respective side surfaces of the holder 15. One end of each of the springs 17 and 18 are fixed to a carriage 40. In the present embodiment, the supporting member 19 and carriage 21 of the first embodiment are formed as the single carriage 40. The carriage 40 has formed therein a pair of slide bearings 25a and 25b which are separated from each other in the tracking direction x. A guide rail 28 is inserted into these slide bearings 25a and 25b. A mirror 14 is secured to an inclined surface of the carriage 40. Further the carriage 40 has formed therein a slide bearing 26. A guide rail 29 is inserted in to this slide bearing 26. It should be noted that viewed in the direction y, the slide bearing 26 situates at a middle point between the slide bearings 25a and 25b. A single tracking coil 22 is secured to the carriage 40.

On a base member 1, a center yoke 31 having a short ring 32 applied thereto is arranged on a base member 1. To the center yoke 31 is secured a side yoke 33 at both ends thereof, such that a space is formed between an upper surface of the center yoke 31 and a lower surface of the side yoke 33. It should be noted that the center yoke 31 is inserted into the tracking coil 22. To the lower surface of the side yoke 33 is secured a permanent magnet 34. Therefore, an upper side of the tracking yoke 22 situates in a magnetic flux generated between the center yoke and the magnet 34. On the base member an upright yoke 41 is secured and a first focusing permanent magnet 42 is secured to an inner surface of the upright yoke at such a position that the magnet 42 faces a lower side of the first focusing coil 16a. On an inner side surface of the side yoke 33 is secured a second focusing permanent magnet 43 at such a level that the magnet 43 faces a lower side of the second focusing coil 16b.

In the present embodiment, only the single tracking coil 22 is provided between the guide rails 28 and 29, and thus the movable member 7 can be moved in the tracking direction x without causing undesired twisting movement.

Now a static friction of the supporting mechanism of the optical pick-up apparatus will be explained.

As explained above, in the single-stage servo optical pick-up apparatus in which the tracking control and access control are performed by the same driving mechanism, it is necessary to decrease a coefficient of static friction for obtaining a desired servo characteristic. Now a control loop of the tracking control may be considered as illustrated in FIG. 7.

Now it is assumed that a coefficient of static friction of the supporting mechanism is denoted by $\mu$s, a residual error due to the static friction $\Delta$x [m], a mass of the movable member M [kg] and the acceleration of gravity g [m/s$^2$]. In order to move the movable member against the frictional force under a condition that the residual error $\Delta$x[m] is existent, the following condition has to be satisfied:

$$\Delta X \cdot G_{TR} > \mu s \cdot M \cdot g \qquad (1)$$

Now it is assumed that a loop gain of the tracking servo is represented by $G_L$. Then, the tracking gain $G_{TR}$ may be expressed by $G_L/(1/M \cdot 1/S^2) = G_L \cdot M \cdot S^2$. Therefore, the above inequality (1) may be rewritten in the following manner:

$$\Delta x \cdot G_L \cdot M \cdot S^2 > \mu s \cdot M \cdot g \Delta x \cdot G_L \cdot S^2 > \mu s \cdot g \qquad (2)$$

Further, it is assumed that an acceleration of an external disturbance of in the tracking direction is denoted by $\alpha$D [m/s$^2$], a desired error $\Delta$e[m], and a preliminary pressure applied to the movable member is represented by F [N]. Then, a desired loop gain $G_L$ may be expressed in the following manner:

$$G_L = (\alpha D/S^2)/\Delta e \quad (3)$$

Therefore, the inequality (2) may be rewritten in the following manner:

$$\Delta x \cdot (\alpha D/\Delta e) > \mu s \cdot g$$

Therefore, according to the invention, the supporting mechanism has to be constructed to satisfy the following condition:

$$\mu s < \alpha D \cdot (\Delta x/\Delta e)/g \quad (4)$$

The acceleration of external disturbance in the tracking direction αD of 3.5" or 5.25" magneto-optical disk is determined by ISO to be 12 m/S² at a rotation speed of 3600 rpm. In order to suppress the degradation of the read out signal due to the residual error of the tracking servo smaller than 10%, it is necessary to make the residual tracking error 0.1μm. Therefore, according to the invention, the desired residual error Δe is set to 0.1 μm. In the ordinary dual-stage servo system, there is produced an off-set in the tracking error signal and this off-set amounts to 0.02 μm. Then, the residual tracking error has to be suppressed not larger than 0.08 μm in order to attain the desired residual error Δe of 0.1 μm. In the single-stage servo control system according to the invention, the residual tracking error Δx due to the static friction is set to 0.02 μm. Then, the total tracking error can be made smaller than 0.1 μm by satisfying the following condition:

$$\mu s < \alpha D \cdot (\Delta x/\Delta e)/g = 12 \times (0.02/0.1)/9.8 \simeq 0.245$$

As stated above, according to the invention, the preliminary pressure may be applied to the movable member. In this case, the inequality (1) may be rewritten as follows:

$$\Delta x \cdot G_{TR} > \mu s (M \cdot g + F) \quad (5)$$

Then, the condition (4) may be expressed in the following manner:

$$\mu s < \alpha D \cdot (\Delta x/\Delta e) \cdot (M/(Mg+F)) \quad (6)$$

For instance, when the preliminary pressure F of a value equal to the mass M of the movable member (M=1.8 gr), the following condition may be obtained:

$$\mu s < \alpha D \cdot (\Delta x/\Delta e)/2g = 0.122$$

It should be noted that $F=1.8 \times 10^{31}\ ^3 \times 9.8 = 1.8 \times 10^{-3}$ N. In general, when the preliminary pressure is applied to the movable member in order to reduce a play between the slide bearings and the guide rails, a coefficient of static friction has to be made much smaller. It should be noted that the condition (4) can be obtained by setting the preliminary pressure F in the inequality (5) to be zero. Therefore, according to the invention, it is generally stated that the supporting mechanism is constructed to satisfy the condition (5) in regardless of a value of the preliminary pressure inclusive zero.

As can be understood from the above explanation, according to the invention the optical pick-up apparatus of single-stage servo in which the tracking control and access control are performed by the same driving mechanism can be realized by satisfying the condition (5). Particularly, in case of not applying the preliminary pressure to the movable member, a coefficient of static friction us should be not larger than 0.25 and when the preliminary pressure having an amount equal to a mass of the movable member is applied, a coefficient of static friction should preferably be set to a value not larger than 0.12.

The present invention is not limited to the embodiment explained above, but many modifications and alternations may be conceived by those skilled in the art within the scope of the invention. In the above embodiment, the slide bearings are formed integrally with the carriage, but according to the invention, slide bearings formed separately from the carriage may be installed within the carriage. In such a case, the slide bearings may be made of fluorine-contained resin. Further, the slide bearings may be made of a material having a low coefficient of friction and a high abrasion resistance such as polyimide resin containing PTFE or lubricating oil.

In the above embodiment, the guide rail is formed by a stainless steel rod, but according to the invention, the guide rail may be formed by a ceramic rod such as silicon carbide or zirconia, a surface of said ceramic rod being polished to have a surface roughness not larger than 1S, preferably about 0.3S.

What is claimed is:

1. An optical pick-up apparatus comprising:

a light source emitting a light beam;

an objective lens projecting said light beam emitted by said light source onto an optical record medium as a fine spot;

a movable member including a holding means for holding said objective lens movably in a focusing direction parallel to an optical axis of the objective lens to perform a focusing control and a carriage on which said holding means is provided;

a supporting means for supporting said movable member movably in a tracking direction perpendicular to said focusing direction as well as to a direction of an information track formed in the optical record medium; and a tracking and access driving means for driving said movable member in said tracking direction to perform a tracking control and an access control, wherein said supporting means includes guide members extending in said tracking direction and said movable member includes (i) plural supporting portions for receiving said guide members and (ii) slide bearings disposed on parts of said plural supporting portions so as to be stationary thereon and having an engagement surface for coupling with said guide members, and a coefficient of static friction between said slide bearings and said guide members is set to be not larger than 0.25.

2. An apparatus according to claim 1, wherein said slide bearings are formed integrally with said carriage as a single body.

3. An apparatus according to claim 1, wherein at least one of said guide members is formed by a rod having a circular cross section, and at least one of said slide bearings is formed to have a substantially rectangular cross section and said at least one of said guide members is brought into contact with portions of four side planes of said at least one of the slide bearings.

4. The apparatus according to claim 1, wherein each of said slide bearings of said supporting means has a rectangular cross-section.

5. An apparatus according to claim 1, wherein said slide bearings are made of a thermoplastic polyimide resin containing carbon fibers.

6. An apparatus according to claim 1, wherein said slide bearings are made of an epoxy resin containing silica balls.

7. An apparatus according to claim 1, wherein said slide bearings are made of a fluorine-contained resin.

8. An apparatus according to claim 1, wherein said guide member are formed by a stainless steel rod having a coating of fluoroplastics applied thereon.

9. An apparatus according to claim 8, wherein said coating of fluoroplastics of the guide member has a thickness of 5–20 μm and has a surface roughness not larger than 3.2S.

10. An apparatus according to claim 1, wherein said guide member are formed by a rod having a circular cross section and a surface roughness of about 0.3S.

11. An apparatus according to claim 10, wherein said guide member are made of ceramics.

12. An apparatus according to claim 1, wherein said driving means includes at least one tracking coil secured to the carriage and at least one magnetic circuit comprising a permanent magnet and yokes for generating a magnetic flux passing through the tracking coil, and said tracking coil is formed by an aluminum wire.

13. An apparatus according to claim 1, wherein said driving means includes at least one tracking coil secured to the carriage and at least one magnetic circuit comprising a permanent magnet and yokes for generating a magnetic flux passing through the tracking coil, and said tracking coil is formed by an aluminum wire having a copper cladding.

14. An apparatus according to claim 1, wherein said driving means includes at least one tracking coil secured to the carriage and at least one magnetic circuit comprising a permanent magnet and yokes for generating a magnetic flux passing through the tracking coil, and said tracking coil has an inductance not higher than 100 μH.

15. An apparatus according to claim 1, wherein said movable member is constructed to have a resonance frequency in the tracking direction not lower than 10 kHz.

16. An apparatus according to claim 1, wherein a cut-off frequency of a tracking servo in the tracking direction of the movable member is not lower than 1 kHz.

17. An apparatus according to claim 1, wherein said slide bearings have a surface having a surface roughness of about 0.3–3S.

18. An apparatus according to claim 17, wherein said slide bearings have a surface having a surface roughness not greater than 6.3S.

19. An apparatus according to claim 1, wherein each of said guiding members has a surface having a surface roughness not greater that 3.2S.

20. An apparatus according to claim 1, wherein said slide bearings have a rectangular cross-section and a surface having a surface roughness of not greater than 6.3S and said guide members have a circular cross-section and a surface having a surface roughness not greater than 3.2S.

21. The apparatus according to claim 1, wherein said engagement surface of said slide bearings are substantially flat.

22. An optical pick-up apparatus comprising:

a light source emitting a light beam;

an objective lens projecting said light beam emitted by said light source onto an optical record medium as a fine spot;

a movable member including a holding means for holding said objective lens movably in a focusing direction parallel to an optical axis of the objective lens to perform a focusing control and a carriage on which said holding means is provided;

a supporting means for supporting said movable member movably in a tracking direction perpendicular to said focusing direction as well as to a direction of an information track formed in the optical record medium; and a driving means for driving said supporting means in said tracking direction to perform a tracking control as well as an access control; wherein said supporting means includes guide members extending in said tracking direction and slide bearings provided in the movable member and coupled with said guide members, and said slide bearings and guide members are constructed to satisfy the following condition:

$$\mu s < \alpha D \cdot (\Delta x/\Delta e) \cdot M/(Mg+F)$$

wherein μs is a coefficient of static friction between said slide bearings and said guide members, αD an acceleration of an external disturbance in the tracking direction, Δx a residual error introduced by the static friction, Δe a desired residual error, M a mass of the movable member including the slide bearings, g is the acceleration of gravity, and F is a preliminary pressure value inclusive zero.

23. An apparatus according to claim 22, wherein said slide bearings are made of a thermoplastic polyimide resin-containing carbon fibers.

24. An apparatus according to claim 22, wherein said slide bearings are made of an epoxy resin containing silica balls.

25. An apparatus according to claim 22, wherein said slide bearings are made of a fluorine-contained resin.

* * * * *